(12) United States Patent
Mino

(10) Patent No.: US 6,769,571 B2
(45) Date of Patent: Aug. 3, 2004

(54) TILT-LESS DISCHARGE LINER SYSTEM FOR BULK MATERIAL CARGO CONTAINERS

(75) Inventor: Oswaldo Mino, Houston, TX (US)

(73) Assignee: Illinois Tool Works Inc., Glenview, IL (US)

(*) Notice: Subject to any disclaimer, the term of this patent is extended or adjusted under 35 U.S.C. 154(b) by 110 days.

(21) Appl. No.: 10/209,607

(22) Filed: Aug. 1, 2002

(65) Prior Publication Data

US 2004/0020937 A1 Feb. 5, 2004

(51) Int. Cl.$^7$ ............................. B67B 7/00; G01F 11/00
(52) U.S. Cl. ..................... 222/1; 222/105; 222/386.5; 220/1.6
(58) Field of Search ........................... 222/1, 92, 105, 222/183, 386.5; 220/1.6

(56) References Cited

U.S. PATENT DOCUMENTS

| | | | |
|---|---|---|---|
| 3,822,919 A | * | 7/1974 | Strom .......................... 406/90 |
| 4,884,722 A | | 12/1989 | Podd |
| 5,137,170 A | | 8/1992 | Matias |
| 5,152,735 A | | 10/1992 | Podd, Jr. et al. |
| 5,193,710 A | | 3/1993 | Podd, Sr. et al. |
| 5,222,621 A | | 6/1993 | Matias |
| 5,421,476 A | | 6/1995 | Matias |
| 5,489,037 A | | 2/1996 | Stopper |
| 5,542,563 A | | 8/1996 | Matias |
| 5,657,896 A | | 8/1997 | Matias |
| 6,481,598 B1 | * | 11/2002 | Thornsen .................... 222/105 |

* cited by examiner

Primary Examiner—Timothy L. Maust
(74) Attorney, Agent, or Firm—Schwartz & Weinrieb

(57) ABSTRACT

An inflatable bulk material cargo container liner has a plurality of inflatable air bags integrally incorporated therein. The inflatable air bags have substantially right triangular configurations when disposed in their inflated states such that hypotenuse portions of the inflatable air bags are inclined downwardly with respect to the bottom surface portion of the bulk material cargo container liner. When the inflatable air bags are inflated, the bulk material cargo load can be discharged from the bulk material cargo container liner without the need for tilting the bulk material cargo container and the liner contained therein. In addition, the bulk material cargo container, can be used as a silo or storage facility wherein the air bags can be inflated to predetermined degrees so as to cause predetermined portions of the bulk cargo load to be discharged as desired.

29 Claims, 1 Drawing Sheet

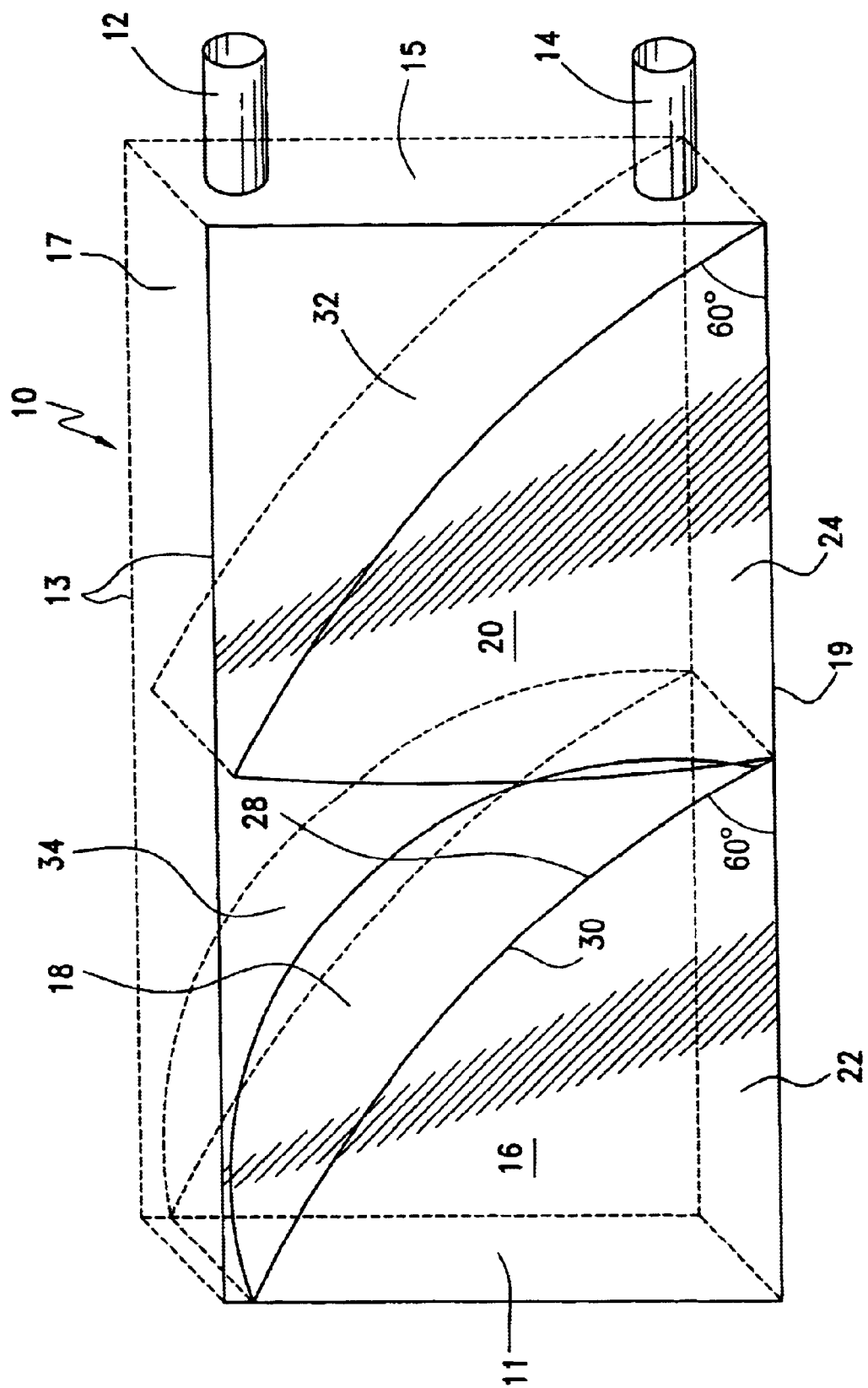

TILT-LESS DISCHARGE LINER SYSTEM FOR BULK MATERIAL CARGO CONTAINERS

FIELD OF THE INVENTION

The present invention relates generally to bulk material cargo containers within which fluid-like or flowable cargo materials, such as, for example, dry bulk chemicals, powdered, flaked, and pelletized resins, flour, coffee beans, grain, and the like, are normally housed or contained while being shipped or transported, and more particularly to a new and improved bulk material cargo container liner system, for use in conjunction with such bulk material cargo containers, wherein the new and improved bulk material cargo container liner system not only enables or facilitates the discharge of the bulk material cargo load from the bulk material cargo container in accordance with operational techniques which do not require the bulk material cargo container to be moved into a tilted mode, as is normally performed or conducted in accordance with conventional or PRIOR ART bulk material cargo load discharge techniques, but in addition, the new and improved bulk material cargo container liner system, and the discharge structure thereof, enables the bulk material cargo container to be utilized as a bulk material storage bin or silo.

BACKGROUND OF THE INVENTION

Bulk material cargo containers are conventionally used, at different times, to house or contain different fluid-like or flowable cargo materials, such as, for example, dry bulk chemicals, powdered, flaked, and pelletized resins, flour, coffee beans, grains, rice, sugar, and the like, while the cargo materials are being shipped or transported from one location to another by means of, for example, ship, truck, railroad, and the like. Since different bulk materials are shipped or transported within particular bulk material cargo containers at different times, it is imperative that the bulk material cargo containers effectively be clean so as not to contaminate the materials comprising a particular bulk material cargo load with residual materials which may remain within the bulk material cargo container from a previously shipped or transported bulk material cargo load. Accordingly, in order to eliminate the normally necessary cleaning of each bulk material cargo container hold after a particular bulk material cargo load has been unloaded or discharged from a particular one of the bulk material cargo container holds, it has become conventional within the industry to employ removable bulk material cargo container liners within the cargo holds of the bulk material cargo containers wherein, after a particular bulk material cargo load has been delivered to its destination and discharged or unloaded, the bulk material cargo container liner is simply removed from the bulk material cargo container whereby the bulk material cargo container is again useable, without a significant amount of cleaning, for carrying another bulk material cargo load typically comprising fluid or flowable material. Examples of bulk material cargo container liners as used within bulk material cargo containers for shipping or transporting fluid or flowable materials may be found within U.S. Pat. No. 5,489,037 which issued on Feb. 6, 1996 to Stopper, U.S. Pat. No. 5,193,710 which issued on Mar. 16, 1993 to Podd, Sr. et al., and U.S. Pat. No. 4,884,722 which issued on Dec. 5, 1989 to Podd.

As is also well-known in the industry, different bulk cargo load materials exhibit different flowability characteristics, and conventionally, the most common manner in which such flowability is effectively induced within or with respect to the different bulk cargo load materials is to cause the bulk cargo container to undergo a tilting operation. More particularly, when a particular bulk cargo container, carrying a particular bulk cargo load material, undergoes a predetermined amount or degree of tilt, the particular bulk cargo load material will begin to flow under the influence of gravity and may accordingly be conducted toward a discharge port operatively associated with the bulk cargo container whereby the bulk cargo load material can be discharged from the bulk cargo container. Normally, in order to comprise economically viable bulk material cargo transportation, delivery, and distribution systems, the systems comprise an operative integration of bulk material cargo container transportation facilities, such as, for example, rail hopper cars or a fleet of bulk material cargo container tractor-trailer trucks, sea-going bulk material cargo container ships, and the like; bulk material cargo container tilt apparatus conveniently or viably positioned at predetermined locations adjacent to or near the bulk material cargo container transportation facilities for operatively handling the aforenoted rail-hopper cars, tractor-trailer trucks, and ship containers in order to discharge or unload the bulk material cargo loads carried thereby; and silo or other similar bulk material storage facilities also conveniently or viably positioned at predetermined locations with respect to the aforenoted transportation and handling facilities so as to be capable of storing the unloaded bulk material cargo loads in preparation for, or in conjunction with, the distribution of such bulk material to end user customers.

Unfortunately, as may be readily appreciated, the construction and operation of such an integrated transportation, handling, and distribution system is relatively expensive whereby it is only economically viable for such integrated transportation, delivery, and distribution systems to be constructed and operated by relatively large-sized companies located primarily within the highly-industrialized nations. Accordingly, relatively medium-sized and small-sized companies are not able to viably compete economically with such relatively large-sized companies in view of the fact that such medium-sized and small-sized do not have access to, or the economic resources to construct and operate, the aforenoted integrated bulk material cargo container transportation and handling facilities, or the bulk material storage and distribution facilities. At best, if such relatively medium-sized and small-sized companies nevertheless desire to engage in bulk material cargo load transportation, handling, and distribution businesses, and try to be competitive with the relatively large-sized companies, they are often forced to lease necessary services or facilities from the relatively large-sized companies which, again, is not economically advantageous. However, if a bulk material cargo container system could be developed wherein tilt-type handling apparatus was no longer necessary for discharging or unloading the bulk material cargo load from the bulk material cargo containers, or in addition, if a system could likewise be developed wherein auxiliary silo-type storage facilities were likewise no longer necessary for storing and distributing bulk material cargo loads from bulk material cargo containers, then the relatively medium-sized and small-sized companies could enjoy the ecomonic advantages to be derived from bulk material cargo load transportion, handling, and distribution systems whereby the relatively medium-sized and small-sized companies can in fact viably compete economically with the relatively large-sized companies.

A need therefore exists in the art for a new improved a bulk material cargo container system wherein tilt-type handling apparatus is no longer necessary for discharging or unloading the bulk material cargo load from the bulk material cargo containers, and in addition, a new and improved bulk material cargo container system wherein auxiliary silo-type storage facilities is likewise no longer necessary for storing and distributing bulk material cargo loads from bulk material cargo containers, whereby relatively medium-sized and small-sized companies can enjoy the ecomonic advantages to be derived from bulk material cargo load transportion, handling, and distribution systems such that the relatively medium-sized and small-sized companies can in fact viably compete economically with the relatively large-sized companies.

OBJECTS OF THE INVENTION

Accordingly, it is an object of the present invention to provide a new and improved bulk material cargo container system.

Another object of the present invention is to provide a new and improved bulk material cargo container system which effectively overcomes the various operational disadvantages characteristic of PRIOR ART bulk material cargo container systems.

An additional object of the present invention is to provide a new and improved bulk material cargo container system which comprises a unique and novel bulk material cargo container inflatable liner system which, in turn, comprises a plurality of inflatable air bags integrally incorporated therein, whereby when such inflatable air bags are inflated in accordance with a unique and novel method characteristic of the present invention, the bulk material cargo load disposed within the bulk material cargo container can be discharged and unloaded from the bulk material cargo container without requiring the tilting of the bulk material cargo container as is characteristic of PRIOR ART bulk material cargo container unloading techniques or procedures.

A further object of the present invention is to provide a new and improved bulk material cargo container system which comprises a unique and novel bulk material cargo container inflatable liner system which, in turn, comprises a plurality of inflatable air bags integrally incorporated therein, whereby when such inflatable air bags are inflated in accordance with a unique and novel method characteristic of the present invention, the bulk material cargo load disposed within the bulk material cargo container can be discharged and unloaded from the bulk material cargo container without requiring the tilting of the bulk material cargo container, and in addition, the bulk material cargo load can be stored within the bulk material cargo container which will serve as a bulk material storage silo.

A last object of the present invention is to provide a new and improved bulk material cargo container system which comprises a unique and novel bulk material cargo container inflatable liner system which, in turn, comprises a plurality of inflatable air bags integrally incorporated therein, whereby when such inflatable air bags are inflated in accordance with a unique and novel method characteristic of the present invention, the bulk material cargo load disposed within the bulk material cargo container can be discharged and unloaded from the bulk material cargo container without requiring the tilting of the bulk material cargo container, and in addition, the bulk material cargo load can be stored within the bulk material cargo container which will serve as a bulk material storage silo whereby relatively medium-sized and small-sized companies can enjoy the ecomonic advantages to be derived from bulk material cargo load transportation, handling, and distribution systems such that the relatively medium-sized and small-sized companies can in fact viably compete economically with the relatively large-sized companies.

SUMMARY OF THE INVENTION

The foregoing and other objectives are achieved in accordance with the teachings and principles of the present invention through the provision of a new and improved bulk material cargo container system which comprises an inflatable bulk material cargo container liner which has a plurality of inflatable air bags integrally incorporated therein. The inflatable air bags have substantially right triangular configurations when disposed in their inflated states such that hypotenuse portions of the inflatable air bags are inclined with respect to the bottom or lower surface portion of the bulk material cargo container liner. In this manner, when the inflatable air bags are inflated in accordance with a predetermined sequential operation, the bulk material cargo load can be discharged or unloaded from the bulk material cargo container liner without the need for tilting the bulk material cargo container and the liner contained therein. In addition, the bulk material cargo container, having the new and improved bulk material cargo container liner disposed therein, can be used as a silo or storage facility for the bulk cargo load material, and in accordance with predetermined degrees to which the inflatable air bags can be inflated, the bulk cargo load material can be dispensed, discharged, or unloaded as desired or required.

BRIEF DESCRIPTION OF THE DRAWINGS

Various other objects, features, and attendant advantages of the present invention will be more fully appreciated from the following detailed description when considered in connection with the accompanying drawing wherein:

The SOLE FIGURE is a schematic view illustrating a new and improved bulk material cargo container liner, constructed in accordance with the principles and teachings of the present invention and showing the cooperative parts thereof, for achieving the discharge and unloading of bulk material cargo loads disposed within a bulk material cargo container without necessitating any operative tilting of the bulk material cargo container.

DETAILED DESCRIPTION OF THE PREFERRED EMBODIMENT

Referring now to the SOLE FIGURE of the drawings, a new and improved bulk material cargo container liner, constructed in accordance with the principles and teachings of the present invention and showing the cooperative parts thereof, for achieving the discharge and unloading of bulk material cargo loads disposed within a bulk material cargo container, without necessitating any operative tilting of the bulk material cargo container, is disclosed and is generally indicated by the reference character 10. The bulk material cargo container liner 10 is inflatable by suitable means, not shown, and when so inflated, it is seen that the bulk material cargo container liner 10 has a geometrical configuration which is substantially that of a rectangular parallelepiped so as to effectively conform to the interior bulk material cargo space defined within a conventional bulk material cargo container. More particularly, the inflated bulk material cargo container liner 10 comprises a front wall surface portion 11, a pair of oppositely disposed side wall surface portions 13,13, a rear wall surface portion 15, an upper or top wall surface portion 17, and a lower or bottom wall surface portion 19. As is also conventional, the bulk material cargo container liner 10 is provided with an upper charging or loading port 12 and a lower discharging or unloading port 14 which are fixedly mounted upon the rear surface wall portion 15 of the bulk material cargo container liner 10 which faces or is disposed toward rear doors, not shown, of the bulk material cargo container.

As has been noted hereinbefore, in order to discharge or unload the bulk material cargo load or contents from the bulk material cargo container liner 10, the bulk material cargo container, within which the bulk material cargo container liner 10 is disposed, is normally tilted, however, in accordance with the teachings and principles of the present invention, the need for tilting the bulk material cargo container, in order to discharge or unload the bulk material cargo load or contents therefrom, is obviated or rendered unnecessary. More particularly, if tilting of the bulk material cargo container is to be obviated, means must nevertheless be provided in conjunction with the bulk material cargo container liner 10 in order to effectively simulate the tilting of the bulk material cargo container so as to cause the bulk material cargo load or contents to experience its requisite movement or flowability toward the discharge or unloading port 14 so as to in fact be able to be discharged or unloaded from the bulk material cargo container liner 10. In accordance then with the particular principles and teachings of the present invention, the bulk material cargo container liner 10 has integrally incorporated therein a plurality of inflatable air bags 16,18,20 wherein each one of the three inflatable air bags 16,18,20 is adapted to be inflated and deflated independently with respect to the inflation and deflation of any of the other two of the inflatable air bags 16,18,20 by means of, for example, suitable valve structures, not shown, which are adapted to be fluidically connected to suitable inflation and deflation control means, also not shown.

It is specifically noted that the first and third inflatable air bags 16,20 have their respective bottom or lower end surface portions 22,24 fixedly secured to the bottom or lower surface portion 19 of the bulk material cargo container liner 10, while the second inflatable air bag 18 is not at all secured to the bottom or lower surface portion 19 of the bulk material cargo container liner 10, but, to the contrary, has its bottom or lower surface portion 28 fixedly secured to the top or upper surface portion 30 of the first inflatable air bag 16. As can readily be appreciated from the SOLE FIGURE, when the first and third inflatable air bags 16,20 are disposed or oriented in their fully inflated states, the first and third inflatable air bags 16, 20 have a substantially right-triangular configuration with the top or upper surface hypotenuse portions 30,32 thereof disposed at an angle of approximately 60° with respect to the lower or bottom surface portions 22,24 thereof, and in addition, due to the fixation of the second inflatable air bag 18 atop the first inflatable air bag 16, the angular disposition or orientation of the upper surface portion 28 of the second inflatable air bag 18 with respect to the bottom or lower surface portion 19 of the bulk material cargo container line 10 is even greater than 60°. Furthermore, it is additionally noted that the lower, rear end portion of the third inflatable air bag 20 is disposed immediately adjacent to the bulk material cargo container liner discharge or unloading port 14 such that when the third inflatable air bag 20 is disposed in its fully inflated state, as will be described shortly hereinafter, the bulk material cargo load disposed within the bulk material cargo container liner 10 can in fact be readily discharged from the bulk material cargo container liner 10 and out through the discharging or unloading port 14. It is still yet further noted that when the first, second, and third inflatable air bags 16,18,20 are inflated, the uppermost portion of each inflated air bag 16,18,20 is disposed at an elevational level which substantially corresponds to that of the charging or loading port 12.

When a bulk material cargo load is initially loaded or charged into the bulk material cargo container liner 10 through means of the charging or loading port 12, it is noted that all three of the inflatable air bags 16,18,20 will be disposed in their deflated states so as to in fact permit a full and complete bulk material cargo load to be charged or loaded into the bulk material cargo container liner 10. Subsequently, when a portion or all of the bulk material cargo load is desired to be discharged or unloaded from the bulk material cargo container liner 10 in accordance with the unique and novel operational procedures characteristic of the present invention, the discharging or unloading port 14 is deployed to its discharging or unloading position and the third inflatable air bag 20 is initially inflated so as to be disposed in its illustrated fully inflated state. As a result of the inflation of the third inflatable air bag 20, whereby, as has been previously noted, the top or upper surface portion 32 of the third inflatable air bag 20 will be disposed at an angle of substantially 60°, it can be readily appreciated that the inflated air bag 20 will cause the bulk material cargo load disposed within substantially the entire rear half portion of the bulk material cargo container liner 10 to flow toward the discharging or unloading port 14 so as to in fact be discharged or unloaded from the bulk material cargo container liner 10.

Subsequently, after the substantially entire rear half portion of the bulk material cargo load disposed within the bulk material cargo container liner 10 has been caused to flow toward the discharging or unloading port 14 so as to in fact be discharged or unloaded from the bulk material cargo container line 10, the third inflatable air bag 20 is deflated so as to again be disposed in a substantially flattened state along the bottom or lower surface portion 24 of the bulk material cargo container line 10. This flattening process will of course also be somewhat aided or facilitated as a result of the natural tendency of the bulk material cargo load, originally disposed within substantially the forward half portion of the bulk material cargo container liner 10 and atop the deflated first and second inflatable air bags 16,18, to begin to flow over and atop the deflated third inflatable air bag 20 in view of the fact that the substantially rear half portion of the bulk material cargo load originally disposed within the bulk material cargo container liner 10 has already been discharged or unloaded from the bulk material cargo container liner 10. Accordingly, in order to in fact achieve the discharging or unloading of the entire front half or any residual portion of the bulk material cargo load from the bulk material cargo container liner 10, the first and second inflatable air bags 16,18 are now inflated in a serial manner, that is, the first inflatable air bag 16 is initially inflated, and upon complete inflation thereof, the second inflatable air bag 18 is inflated.

As a result of the inflation of the first and second inflatable air bags 16,18 as illustrated within the SOLE FIGURE, it can be readily appreciated that the entire front portion of the bulk material cargo load, originally disposed atop the deflated first and second inflatable air bags 16, 18, will now be pushed toward the rear surface wall portion 15 of the bulk material cargo container liner 10 and be caused to flow downwardly along the inclined top or upper surface portion 34 of the second inflatable air bag 18 so as to eventually be disposed atop the deflated third inflatable air bag 20. It can therefore be readily appreciated still further that when the third inflatable air bag 20 is again inflated, that is, re-inflated, while the first and second inflatable air bags 16,18 remain in their inflated states, the remaining or residual portion of the bulk material cargo load will be pushed toward the rear surface wall portion 15 and the discharging or unloading port 14 of the bulk material cargo container liner 10 whereby when such remaining or residual portion of the bulk material cargo load flows downwardly along the top or upper surface portion 32 of the third inflatable air bag 20, the remaining or residual portion of the bulk material cargo load will be discharged or unloaded from the bulk material cargo container liner 10 through means of the discharging or unloading port 14.

It is to be noted that while the second inflatable air bag 18 has been provided so as to ensure the fact that, when the first and second inflatable air bags 16,18 are inflated, the proper flowability of the bulk material cargo load, disposed within substantially the front half portion of the bulk material cargo container liner 10, will in fact be achieved such that the bulk material cargo load originally disposed within substantially the front half portion of the bulk material cargo container liner 10 will now be properly disposed atop the deflated third inflatable air bag 20, the first inflatable air bag 16 may be particularly and predeterminedly structured and configured so as to eliminate the necessity of providing the second inflatable air bag 18 in conjunction therewith while nevertheless still being capable of achieving the aforenoted flowability of the bulk material cargo load from substantially the front half portion of the bulk material cargo container liner 10 toward the rear half portion of the bulk material cargo container liner 10. It is additionally noted that in order for the inflatable air bags 16,18,20 to exert the necessary forces upon the bulk material cargo load, and therefore achieve the necessary flowability thereof during the inflation of the inflatable air bags 16,18,20, the inflatable air bags 16,18,20 may be fabricated from an extruded sheet of polyethylene or the like having a predetermined thickness dimension, or alternatively, each inflatable air bag 16,18,20 may actually comprise, for example, a three-layer laminate of polyethylene.

It is additionally noted still further that in view of the fact that it is desired to ensure that, when the various inflatable air bags 16,18,20 are in fact inflated so as to achieve the aforenoted flowability of the bulk material cargo load toward the discharging or unloading port 14, no portion of the bulk material cargo load becomes trapped between any one of the inflatable air bags 16,18,20 and an interior wall portion of the bulk material cargo container liner 10, the inflatable air bags 16,18,20 may have geometrical configurations which are different from those that are illustrated. Still further, while it has been disclosed that the first and third inflatable air bags 16,20 only have their lower or bottom surface portions 22,24 fixedly secured to the lower or bottom surface portion 19 of the bulk material cargo container liner 10, other surface portions of the first and third inflatable air bags 16,20 may in fact be appropriately secured to corresponding surface portions of the bulk material cargo container liner 10. Lastly, it is noted that when each one of the different inflatable air bags 16, 18,20 is in fact inflated, they need not necessarily be inflated to their fully inflated states, but to the contrary, the inflatable air bags 16,18,20 may be only partially inflated to predeterminedly controlled degrees or amounts. In this manner, in accordance with another primary objective characteristic of the bulk material cargo container liner 10 of the present invention, the bulk material cargo container, within which the bulk material cargo container liner 10 is disposed, can be utilized as a silo or storage facility for the bulk cargo load material whereby the same may be stored and subsequently dispensed or discharged in predetermined amounts as desired or required.

More particularly, when the bulk material cargo container, within which the bulk material cargo container liner 10 is disposed, is to be utilized as a silo or storage facility for the bulk cargo load material whereby the bulk material cargo load may be stored and subsequently dispensed or discharged in predetermined amounts as desired or required, various inflation modes of operation may be conducted in connection with the three inflatable air bags 16,18,20. For example, after bulk material cargo load has been completely charged into the bulk material cargo container liner 10 for storage therein while the three inflatable air bags 16,18,20 are all disposed in their deflated states, and when it is desired to dispense predetermined amounts of the bulk material cargo load from the bulk material cargo container liner 10 through means of the discharge port 14 thereof, the third inflatable air bag 20 may be partially inflated to predetermined degrees so as to continuously or intermittently discharge predetermined portions of the bulk cargo material, disposed atop the deflated third air bag 20 and within the rear half portion of the bulk material cargo container liner 10, through the discharge port 14. Upon depletion or discharge of such bulk cargo material previously disposed within the rear half portion of the bulk material cargo container liner 10, the third inflatable air bag 20 is then completely deflated, and the first and second inflatable air bags 16,18 are inflated so as to effectively cause the bulk material cargo disposed within the front half portion of the bulk material cargo container liner 10 to flow and be transferred onto or atop the now deflated third inflatable air bag 20. When such bulk material cargo has been effectively completely transferred onto or atop the deflated third inflatable air bag 20, the third inflatable air bag 20 can again be inflated, or re-inflated, to predetermined degrees so as to again discharge predetermined portions of the remaining or residual bulk material cargo load originally contained within the bulk material cargo container liner 10.

Thus, it may be seen that in accordance with the various principles and teachings of the present invention, there has been provided a new and improved bulk material cargo container system which comprises an inflatable bulk material cargo container liner which has a plurality of inflatable air bags integrally incorporated therein. When the inflatable air bags are inflated in accordance with a predetermined sequential operation, the bulk material cargo load can be discharged or unloaded from the bulk material cargo container liner without the need for tilting the bulk material cargo container and the liner contained therein. In addition, the bulk material cargo container, having the new and improved bulk material cargo container liner disposed therein, can be used as a silo or storage facility for the bulk cargo load material, and in accordance with predetermined degrees to which the inflatable air bags can be inflated, the bulk cargo load material can be dispensed, discharged, or unloaded as desired or required.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A bulk material cargo container liner for use within a bulk material cargo container having rear door structures, comprising:

a bulk material cargo container liner having a substantially rectangular parallelepiped structure when erected for disposition within a bulk material cargo container and therefore comprising a front wall surface portion, a pair of side wall surface portions, a top wall surface portion, a bottom wall surface portion, and a rear wall surface portion;

a bulk material discharge port operatively mounted upon said rear wall surface portion for permitting bulk material disposed within said bulk material cargo container liner to be discharged from said bulk material cargo container liner; and at least one inflatable air bag disposed within said bulk material cargo container liner for causing substantially the entire bulk material cargo load disposed within said bulk material cargo container liner to undergo fluid flow toward said bulk material discharge port, without said bulk material cargo container liner being required to be disposed within a tilted mode in order to achieve the fluid flow of the bulk material cargo load toward said bulk material discharge port, whereby the bulk material cargo load can be discharged from said bulk material cargo container liner.

2. The bulk material cargo container liner as set forth in claim 1, wherein:

said at least one inflatable air bag disposed within said bulk material cargo container liner comprises at least two inflatable air bags disposed within said bulk material cargo container liner with a first one of said at least two inflatable air bags is disposed within a front half section of said bulk material cargo container liner while a second one of said at least two inflatable air bags is disposed within a rear half section of said bulk material cargo container liner.

3. The bulk material cargo container liner as set forth in claim 2, wherein:

each one of said at least two inflatable air bags has a substantially right-triangular configuration when inflated such that a hypotenuse surface portion thereof is inclined downwardly toward said a bulk material discharge port operatively mounted upon said rear wall surface portion of said bulk material cargo container liner.

4. The bulk material cargo container liner as set forth in claim 2, wherein:

each one of said at least two inflatable air bags is fabricated from polyethylene.

5. The bulk material cargo container liner as set forth in claim 4, wherein:

each one of said at least two inflatable air bags fabricated from polyethylene comprises a three-layer laminate.

6. The bulk material cargo container liner as set forth in claim 2, wherein:

a bulk material charge port is operatively mounted upon said rear wall surface portion at an elevational level which is above that of said bulk material discharge port so as to permit bulk cargo material to be charged into said bulk material cargo container liner; and uppermost portions of each one of said at least two inflatable air bags are disposed at said elevational level of said bulk material charge port when said at least two inflatable air bags are disposed in their inflated states.

7. The bulk material cargo container liner as set forth in claim 2, wherein:

said at least two inflatable air bags are independently inflatable with respect to each other.

8. The bulk material cargo container liner as set forth in claim 2, wherein:

said at least two inflatable air bags disposed within said bulk material cargo container liner have only their respective bottom surface portions fixedly secured to said bottom wall surface portion of said bulk material cargo container liner.

9. The bulk material cargo container liner as set forth in claim 8, wherein:

said at least two inflatable air bags comprise three inflatable airbags with one of said three inflatable air bags being fixedly secured atop one of the other two of said three inflatable air bags.

10. A bulk material cargo container liner for use within a bulk material cargo container having rear door structures, comprising:

a bulk material cargo container liner having a substantially rectangular parallelepiped structure when erected for disposition within a bulk material cargo container and therefore comprising a front wall surface portion, a pair of side wall surface portions, a top wall surface portion, a bottom wall surface portion, and a rear wall surface portion;

a bulk material discharge port operatively mounted upon said rear wall surface portion for permitting bulk material disposed within said bulk material cargo container liner to be discharged from said bulk material cargo container liner; and at least one air bag disposed within said bulk material cargo container liner and inflatable to predetermined degrees for causing predetermined portions of the bulk material cargo load disposed within said bulk material cargo container liner to undergo fluid flow toward said bulk material discharge port, without said bulk material cargo container liner being required to be disposed within a tilted mode in order to achieve the fluid flow of the bulk material cargo load toward said bulk material discharge port, whereby the bulk material cargo container, within which said bulk material cargo container liner is disposed, can serve as a bulk material cargo load silo storage facility from which the bulk material cargo load can be discharged from said bulk material cargo container liner as desired.

11. The bulk material cargo container liner as set forth in claim 10, wherein:

said at least one inflatable air bag disposed within said bulk material cargo container liner comprises at least two inflatable air bags disposed within said bulk material cargo container liner with a first one of said at least two inflatable air bags is disposed within a front half section of said bulk material cargo container liner while a second one of said at least two inflatable air bags is disposed within a rear half section of said bulk material cargo container liner.

12. The bulk material cargo container liner as set forth in claim 11, wherein:

each one of said at least two inflatable air bags has a substantially right-triangular configuration when inflated such that a hypotenuse surface portion thereof is inclined downwardly toward said a bulk material discharge port operatively mounted upon said rear wall surface portion of said bulk material cargo container liner.

13. The bulk material cargo container liner as set forth in claim 11, wherein:

each one of said at least two inflatable air bags is fabricated from polyethylene.

14. The bulk material cargo container liner as set forth in claim 13, wherein:
each one of said at least two inflatable air bags fabricated from polyethylene comprises a three-layer laminate.

15. The bulk material cargo container liner as set forth in claim 11, wherein:
a bulk material charge port is operatively mounted upon said rear wall surface portion at an elevational level which is above that of said bulk material discharge port so as to permit bulk cargo material to be charged into said bulk material cargo container liner; and
uppermost portions of each one of said at least two inflatable air bags are disposed at said elevational level of said bulk material charge port when said at least two inflatable air bags are disposed in their inflated states.

16. The bulk material cargo container liner as set forth in claim 11, wherein:
said at least two inflatable air bags are independently inflatable with respect to each other.

17. The bulk material cargo container liner as set forth in claim 11, wherein:
said at least two inflatable air bags disposed within said bulk material cargo container liner have only their respective bottom surface portions fixedly secured to said bottom wall surface portion of said bulk material cargo container liner.

18. The bulk material cargo container liner as set forth in claim 17, wherein:
said at least two inflatable air bags comprise three inflatable airbags with one of said three inflatable air bags being fixedly secured atop one of the other two of said three inflatable air bags.

19. A method of discharging a bulk material cargo load from a bulk material cargo container without the necessity of disposing the bulk material cargo container within a tilted mode, comprising the steps of:
providing a bulk material cargo container liner, having a substantially rectangular parallelepiped structure when erected and therefore comprising a front wall surface portion, a pair of side wall surface portions, a top wall surface portion, a bottom wall surface portion, and a rear wall surface portion, within a bulk material cargo container;
operatively mounting a bulk material discharge port upon said rear wall surface portion of said bulk material cargo container liner for permitting bulk material, disposed within said bulk material cargo container liner, to be discharged from said bulk material cargo container liner;
providing at least one inflatable air bag within said bulk material cargo container liner; and
inflating said at least one inflatable air bag within said bulk material cargo container liner for causing substantially the entire bulk material cargo load disposed within said bulk material cargo container liner to undergo fluid flow toward said bulk material discharge port, without said bulk material cargo container liner being required to be disposed within a tilted mode in order to achieve the fluid flow of the bulk material cargo load toward said bulk material discharge port, whereby the bulk material cargo load can be discharged from said bulk material cargo container liner.

20. The method as set forth in claim 19, wherein:
said step of providing said at least one inflatable air bag within said bulk material cargo container liner comprises the provision of at least two inflatable air bags within said bulk material cargo container with a first one of said at least two inflatable air bags being disposed within a front half section of said bulk material cargo container liner while a second one of said at least two inflatable air bags is disposed within a rear half section of said bulk material cargo container liner.

21. The method as set forth in claim 20, further comprising the step of:
providing each one of said at least two inflatable air bags with a substantially right-triangular configuration when inflated such that a hypotenuse surface portion of each one of said at least two inflatable air bags is inclined downwardly toward said a bulk material discharge port operatively mounted upon said rear wall surface portion of said bulk material cargo container liner.

22. The method as set forth in claim 20, further comprising the step of:
separately and independently inflating each one of said at least two inflatable air bags.

23. The method as set forth in claim 22, further comprising the steps of:
providing a bulk material charge port upon said rear wall surface portion of said bulk material cargo container at an elevational level which is above that of said bulk material discharge port so as to permit bulk cargo material to be charged into said bulk material cargo container liner;
charging a bulk material cargo load into said bulk material cargo container liner while each one of said at least two inflatable air bags is respectively disposed in its deflated state;
inflating said second one of said at least two inflatable air bags disposed within said rear half section of said bulk material cargo container liner so as to cause a rear half portion of the bulk material cargo load disposed within said bulk material cargo container liner to flow toward said discharge port so as to be discharged from said bulk material cargo container liner through said discharge port;
deflating said second one of said at least two inflatable air bags disposed within said rear half section of said bulk material cargo container liner;
inflating said first one of said at least two inflatable air bags disposed within said front half section of said bulk material cargo container liner so as to cause a front half portion of the bulk material cargo load disposed within said bulk material cargo container liner to be moved atop said deflated second one of said at least two inflatable air bags; and
re-inflating said second one of said at least two inflatable air bags disposed within said rear half section of said bulk material cargo container liner so as to cause a the bulk material cargo load disposed atop said previously deflated second one of said at least two inflatable air bags to flow toward said discharge port so as to be discharged from said bulk material cargo container liner through said discharge port.

24. A method of discharging a bulk material cargo load from a bulk material cargo container serving as a silo storage facility, comprising the steps of:
providing a bulk material cargo container liner, having a substantially rectangular parallelepiped structure when erected and therefore comprising a front wall surface portion, a pair of side wall surface portions, a top wall surface portion, a bottom wall surface portion, and a rear wall surface portion, within a bulk material cargo container;

operatively mounting a bulk material discharge port upon said rear wall surface portion of said bulk material cargo container liner for permitting bulk material, disposed within said bulk material cargo container liner, to be discharged from said bulk material cargo container liner;

providing at least one inflatable air bag within said bulk material cargo container liner; and inflating said at least one inflatable air bag within said bulk material cargo container liner to predetermined degrees for causing predetermined portions of the bulk material cargo load disposed within said bulk material cargo container liner to undergo fluid flow toward said bulk material discharge port, without said bulk material cargo container liner being required to be disposed within a tilted mode in order to achieve the fluid flow of the bulk material cargo load toward said bulk material discharge port, whereby the bulk material cargo container, within which said bulk material cargo container liner is disposed, can serve as a bulk material cargo load silo storage facility from which the bulk material cargo load can be discharged from said bulk material cargo container liner as desired.

25. The method as set forth in claim 24, wherein:

said step of providing said at least one inflatable air bag within said bulk material cargo container liner comprises the provision of at least two inflatable air bags within said bulk material cargo container with a first one of said at least two inflatable air bags being disposed within a front half section of said bulk material cargo container liner while a second one of said at least two inflatable air bags is disposed within a rear half section of said bulk material cargo container liner.

26. The method as set forth in claim 25, further comprising the step of:

providing each one of said at least two inflatable air bags with a substantially right-triangular configuration when inflated such that a hypotenuse surface portion of each one of said at least two inflatable air bags is inclined downwardly toward said a bulk material discharge port operatively mounted upon said rear wall surface portion of said bulk material cargo container liner.

27. The method as set forth in claim 25, further comprising the step of:

separately and independently inflating each one of said at least two inflatable air bags.

28. The method as set forth in claim 27, further comprising the steps of:

providing a bulk material charge port upon said rear wall surface portion of said bulk material cargo container at an elevational level which is above that of said bulk material discharge port so as to permit bulk cargo material to be charged into said bulk material cargo container liner;

charging a bulk material cargo load into said bulk material cargo container liner while each one of said at least two inflatable air bags is respectively disposed in its deflated state; and inflating said second one of said at least two inflatable air bags disposed within said rear half section of said bulk material cargo container liner to predetermined degrees so as to cause predetermined portions of the bulk material cargo load disposed within said rear half portion of said bulk material cargo container liner to flow toward said discharge port so as to be discharged from said bulk material cargo container liner through said discharge port.

29. The method as set forth in claim 28, further comprising the steps of:

completely deflating said second one of said at least two inflatable air bags disposed within said rear half section of said bulk material cargo container liner;

inflating said first one of said at least two inflatable air bags disposed within said front half section of said bulk material cargo container liner so as to cause a portion of the bulk material cargo load disposed within a front half portion of said bulk material cargo container liner to be moved onto said deflated second one of said at least two inflatable air bags; and re-inflating said second one of said at least two inflatable air bags disposed within said rear half section of said bulk material cargo container liner to predetermined degrees so as to cause predetermined portions of the bulk material cargo load previously moved onto said deflated second one of said at least two inflatable air bags so as to cause the predetermined portions of the bulk material cargo load to flow toward said discharge port so as to be discharged from said bulk material cargo container liner through said discharge port.

* * * * *